United States Patent [19]

Holt et al.

[11] Patent Number: 4,877,759

[45] Date of Patent: Oct. 31, 1989

[54] ONE STEP PROCESS FOR PRODUCING DENSE ALUMINUM NITRIDE AND COMPOSITES THEREOF

[75] Inventors: J. Birch Holt, San Jose; Donald D. Kingman, Danville; Gregory M. Bianchini, Livermore, all of Calif.

[73] Assignee: Regents of the University of California, Oakland, Calif.

[21] Appl. No.: 55,475

[22] Filed: May 29, 1987

[51] Int. Cl.$^4$ ................... C04B 35/58; C01B 21/072
[52] U.S. Cl. ................... 501/96; 423/412; 501/97; 501/98
[58] Field of Search ............ 423/412; 501/96, 97, 501/98

[56] References Cited

U.S. PATENT DOCUMENTS

| | | | |
|---|---|---|---|
| 3,238,018 | 3/1966 | Winter et al. | 423/412 |
| 3,307,908 | 3/1967 | Mandorf | 423/412 |
| 3,551,101 | 12/1970 | Matsuo et al. | 423/412 |
| 3,572,992 | 3/1971 | Komeya et al. | 423/412 |
| 3,607,046 | 9/1971 | Little et al. | 423/412 |
| 4,612,297 | 9/1986 | Kasai et al. | 501/97 |
| 4,666,873 | 5/1987 | Morris, Jr. et al. | 501/96 |
| 4,716,133 | 12/1987 | Horiuchi et al. | 501/97 |
| 4,719,187 | 1/1988 | Bardhan et al. | 501/97 |

FOREIGN PATENT DOCUMENTS

| | | | |
|---|---|---|---|
| 127208 | 7/1985 | Japan | 423/412 |
| 216660 | 12/1968 | U.S.S.R. | 423/412 |
| 784126 | 10/1957 | United Kingdom | 423/412 |

OTHER PUBLICATIONS

Interrante et al., "Studies of Organometallic Precursors to Aluminum Nitride," paper presented at "Better Ceramics Through Chemistry II Symposium" held April 15–19, 1986, Palo Alto, California, pp. 359–366.

J. W. Mellor, *Inorganic and Theoretical Chemistry*, vol, VIII (1947), Longmans, Green, and Co., pp. 111–114.

*Primary Examiner*—Robert L. Stoll
*Assistant Examiner*—Wayne A. Langel
*Attorney, Agent, or Firm*—Shyamala T. Rajender; Leona Lauder; Henry P. Sartorio

[57] ABSTRACT

A one step combustion process for the synthesis of dense aluminum nitride compositions is disclosed. The process comprises igniting pure aluminum powder in a nitrogen atmosphere at a pressure of about 1000 atmospheres or higher. The process enables the production of aluminum nitride bodies to be formed directly in a mold of any desired shape.

11 Claims, No Drawings

ONE STEP PROCESS FOR PRODUCING DENSE ALUMINUM NITRIDE AND COMPOSITES THEREOF

The United States Government has rights in this invention pursuant to Contract No. w-7405-ENG-48 between the U.S. Department of Energy and the University of California, for the operation of Lawrence Livermore National Laboratory.

The present invention is in the general area of combustion synthesis and more specifically, relates to the synthesis of dense aluminum nitride compositions.

BACKGROUND OF THE INVENTION

Aluminum nitride is an advanced ceramic material which exhibits high thermal conductivity, electrical resistivity, high mechanical strength, and resistance to oxidation and thermal shock. As such, it is commercially an important material for use as electronic substrates and high temperature applications. Aluminum nitride powders may be synthesized from organic precursors or directly from its elemental constituents in a plasma or nitriding atmosphere. However, because of its highly covalent structure, it is very difficult to sinter aluminum nitride powders to full density without the addition of a sintering aid. While such sintering additives assist in obtaining high densities, they also adversely affect the mechanical strength and the desirable electrical properties of aluminum nitride.

"Combustion Synthesis: A New Area Of Research In Materials Science", by J. Birch Holt, in Energy & Technology Review, Lawrence Livermore National Laboratory, January 1984, and "Combustion Synthesis: A New Technique For Ceramics Production" by J. Birch Holt, Applied Research, 3-20 to 3-24 (1986), describe combustion reactions for the synthesis of transition metal nitrides by the combustion of mixed powders composed of stoichiometric ratios of the metal powder and sodium azide ($NaN_3$) as a solid source of nitrogen. The use of $NaN_3$ promotes the synthesis of pure nitrides with nearly a 100% yield. The sodium is volatilized at the high temperatures generated in the combustion reactions and does not remain in the product as a contaminant. However, these studies showed that neither silicon nor aluminum powders could be combusted at one atmosphere of nitrogen, with or without the presence of $NaN_3$.

Other methods for the production of dense aluminum nitride using additional sintering aids or performed in more than one step are exemplified by the following patents.

U.S. Pat. No. 3,551,101 issued Dec. 29, 1970, to Snigetomo Matsuo et al., describes a method for the preparation of a sintered mass of aluminum nitride by initially heating a mixture consisting of 55 to 85% by weight of aluminum nitride powder and 15 to 45% by weight of aluminum powder in a nitrogen atmosphere under pressure to melt the aluminum content of the mixture so as to bind the particles of aluminum nitride together, further raising the temperature sufficient to cause a secondary nitrogenation of molten aluminum thereby sintering the mixture of powders.

U.S. Pat. No. 3,607,046 issued Sept. 21, 1971, to Charles M. Little et al., is directed to a composition comprising aluminum nitride formed by heating in the presence of nitrogen, at atmospheric pressure, pure aluminum and a small, catalytic amount of lithium, to a temperature of about 400° C. to 1100° C. The nitrogen reacts with lithium to form lithium nitride, which in turn, reacts with aluminum to form aluminum nitride and lithium.

U.S. Pat. No. 3,692,474 issued Sept. 19, 1972, to Scott G. Arber et al., discloses a method for the production of refractory metal nitrides, such as aluminum nitride, by heating a mixture of the refractory metal, carbon and a zinc or cadmium compound in the presence of nitrogen at a temperature of at least 950° C.

U.S. Pat. No. 3,726,643 issued Apr. 10, 1973, to A. Merzhanov et al., discloses a method of producing high melting refractory inorganic compounds of the Groups IV, V and VI metals by mixing a metal belonging to one of these groups with a nonmetal such as nitrogen, boron, silicon, oxygen, phosphorus, sulfur, fluorine or chlorine and igniting the mixture, in an inert atmosphere, at a temperature sufficient to start combustion of the initial components.

U.S. Pat. No. 4,576,923 issued Mar. 18, 1986 to Daniel Broussaud et al., describes a method for producing compounds of silicon and a metal by nitriding a metal by an exothermic reaction with a nitrogen containing gas. Gas consumption rate is maintained constant as a means of controlling the rate of the reaction, at a selected temperature. A compound of silicon containing 6% aluminum is disclosed.

U.S. Pat. No. 4,585,618 issued Apr. 29, 1986 to Jean-Marie Fresnel et al., teaches a method for the production, generally, of cermets, and more particularly to boride-based ceramics infiltrated with aluminum, by reacting powders of ceramic materials with molten metal such as aluminum at elevated temperatures.

While the foregoing methods teach various methods for the production of different types of aluminum nitride, a highly efficient and relatively inexpensive method should combine the synthesis and densification steps into one operation and be able to produce dense aluminum nitride in any desired shape.

It would, therefore, be desirable to have an improved, highly efficient and relatively inexpensive, one step combustion synthesis method for the production of dense aluminum nitride in any desired shape.

It is thus an object of the subject invention to provide a highly efficient and relatively inexpensive process for the synthesis and densification of aluminum nitride.

It is another object of the present invention to provide pure, dense aluminum nitride compositions.

Yet another object is to provide a one step method for the production of dense aluminum nitride.

Another object of the instant invention is to provide a combustion synthesis method for the production of aluminum nitride.

Another object is to provide aluminum nitride compositions formed directly in a mold of any desired shape.

Additional objects, advantages and novel features of the invention, together with additional features contributing thereto and advantages accruing therefrom will be apparent from the following description of preferred embodiments of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the invention as embodied and broadly described herein, the subject invention is directed to a one step combustion synthesis method for the production of dense aluminum nitride and/or cermets and composites thereof in any desired shape. The method, broadly, comprises igniting pure aluminum powder in a nitrogen atmosphere at a pressure in the range of about 500 to about 1000 atmospheres or higher. More specifically, the method comprises pouring aluminum powder into a suitable container, placing an igniter, such as, for example, a cold-pressed pellet of Ti $B_{1.5}$, on top of the container, loading the container into a high pressure autoclave, pressurizing the autoclave with nitrogen gas to a preselected pressure, igniting the igniter pellet by any suitable means, allowing the combustion to proceed to completion, cooling and depressurizing the autoclave and removing the product thus formed.

The pressure of nitrogen determines the degree of conversion of the aluminum powder to compact, dense aluminum nitride. Depending upon the particle size and type of the aluminum nitride powder used, there is a minimum nitrogen pressure below which ignition and subsequent combustion do not take place. The presence of other inert diluents also influences or determines this minimum nitrogen pressure. Therefore, prior to the combustion synthesis process, this minimum required pressure must first be established based on the particle size and type of aluminum powder used and the presence, if any, of other inert diluents in the synthesis process. The product formed takes the shape of the container. The shape may thus be controlled by the shape of the container used. The container may be made of quartz or other refractory materials.

DETAILED DESCRIPTION OF THE INVENTION

The present invention is directed to a process whereby dense parts of aluminum nitride and/or cermets and composites thereof can be formed by combusting aluminum powder in nitrogen gas under high pressure. The process basically comprises igniting pure aluminum powder in a nitrogen atmosphere at a pressure in the range of about 500 to about 1000 atmospheres or higher. The minimum nitrogen pressure below which ignition and subsequent combustion will not take place is determined by the particle size and type of the aluminum powder used. This minimum nitrogen pressure is also determined or influenced by the presence of other inert diluents. Therefore, prior to the combustion synthesis process, this minimum required pressure must first be established based on the particle size and type of aluminum powder used and the presence, if any, of other inert diluents in the synthesis process. More specifically, the process comprises pouring aluminum powder into a suitable container; placing an igniter such as a cold-pressed pellet of Ti $B_{1.5}$ on top of the container; loading the container into a high pressure autoclave; pressurizing the autoclave with nitrogen gas to a preselected pressure; igniting the igniter pellet by any suitable means, such as, for example, heated tungsten coil, electric match, laser and the like; allowing the combustion to proceed to completion; cooling and depressurizing the autoclave; and removing the product formed.

Typically, by way of example, dense aluminum nitride or a cermet or composite thereof was prepared as follows: aluminum powder or a mixture of aluminum powder and an inert diluent such as, for example, silicon nitride, boron nitride, titanium nitride, hafnium nitride and zirconium nitride, was poured into a quartz container about 1.9cm in diameter and 2.5cm high. A cold-pressed pellet of Ti $B_{1.5}$ was placed near the top of the container, to act as an igniter. A flat tungsten coil was located just above the top surface of the igniter pellet. This assembly of electrical leads, quartz container with the aluminum powder and tungsten coil was loaded into a high pressure autoclave. The autoclave was pressurized with nitrogen gas to a preselected pressure. The reaction was then started by ignition of the starter or igniter pellet with a resistively heated tungsten coil. The calculated adiabatic temperature (maximum temperature) for the combustion of aluminum in nitrogen is 2600° C. without allowances for the heat of fusion. Once ignition occurred, the reaction was completed with the spontaneous movement of a combustion wave through the reactants. The high temperatures are self-generated and the reaction is completed within one to two seconds.

Whether the aluminum combusts or not and whether simple phase aluminum nitride on a Al-AlN cermet is formed or not depends on the pressure of nitrogen gas. For combustion to occur, the nitrogen pressure must be generally higher than about 100 atmospheres. When the pressure was about 680 atmospheres, the product consisted of a cermet of AlN in an Al metal matrix. At a pressure of about 1000 atmospheres nitrogen, the product formed was a completely converted AlN compact that was densified to about 92% of the theoretical densification value. The spherical shape of the AlN formed indicates that its formation was by a fusion process under the high temperature and pressure conditions. Therefore, depending upon the predetermined nitrogen pressure (based on the particle size and type of the aluminum nitride powder used), the final product was either a single phase AlN or a cermet of Al—AlN, in which the matrix phase is aluminum; and, when a mixture of aluminum and an inert diluent was used as the starting material, the resulting product is a dense composite of AlN and the inert diluent. For example, when silicon nitride was used as the inert diluent, the resulting composite was AlN—$Si_3N_4$. Similarly, if aluminum nitride, boron nitride, hafnium nitride, zirconium nitride or titanium nitride are used as the inert diluents, the corresponding composites with AlN are formed.

The purity of the combusted product is directly determined by the degree of purity of the nitrogen and the aluminum powder used. AlN of high purity with a low oxygen content (oxygen being a contaminant in the product) can be synthesized by using high purity nitrogen gas and aluminum powder of sufficient size to reduce the amount of oxygen present. The temperature of the combustion process can be controlled within certain limits by the addition of inert diluents such as AlN to the reactant aluminum powder. The amount of aluminum nitride added to the aluminum reactant powder also controls the nitrogen pressure that is required for the densification process. Nitride composites may also be produced by using aluminum nitride or a different nitride such as silicon nitride, boron nitride, hafnium nitride, zirconium nitride and titanium nitride, as the inert diluent. When $Si_3N_4$ was used as the inert diluent, the composite formed was AlN—$Si_3N_4$.

The experiments showed that it was possible to obtain dense Al—AlN cermet material or a dense AlN product by controlling the pressure of nitrogen. In both cases, the product formed took the shape of the container. The size of the parts is determined by the size and volume of the autoclave. Although quartz containers were used in th examples, other materials such as other refractory materials, for example, boron nitride and the like. Since there may be reactions between the refractory material and the combustion product at the high prevailing temperatures and pressure, the selection of the container material must be carefully considered depending on the product and the degree of its purity desired.

It has thus been shown that the subject invention provides a one step combustion method for the synthesis of aluminum nitride and composites of aluminum nitride. The method is very efficient and economic and produces high purity, dense aluminum nitride, cermets and dense composites thereof. The aluminum nitride, cermets and composites thus formed are very useful as electronic substrates and for other high temperature applications due to their excellent thermal conductivity, electrical resistivity, high mechanical strength, oxidation and thermal shock resistance and relatively low density.

The above embodiments were chosen and described in order to explain best the principles and the practical application of the subject invention thereby to enable those skilled in the art to utilize the invention in various other embodiments and various modifications as are suitable for the particular use contemplated. The foregoing description of a preferred embodiment of the invention has been presented therefore for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A combustion synthesis method for producing dense aluminum nitride comprising igniting aluminum powder in a nitrogen atmosphere at a pressure of about 1000 atmospheres.

2. A method for the synthesis of dense aluminum nitride or cermets or composites thereof comprising the steps of:
   pouring aluminum powder into a suitable container;
   placing an igniter pellet on top of said container;
   loading said container into a high pressure autoclave;
   pressurizing said autoclave with nitrogen gas to a preselected pressure;
   igniting said aluminum powder by igniting said pellet;
   allowing the combustion to proceed to completion; and
   removing the aluminum nitride or aluminum nitride cermet formed in said container.

3. The method of claim 2, wherein said pressure of the nitrogen is about 680 atmospheres.

4. The method of claim 2, wherein said pressure of the nitrogen is about 1000 atmospheres.

5. The method of claim 2, further comprising the addition of an inert diluent to said aluminum powder.

6. the method of claim 5, wherein said diluent is selected from the group consisting of silicon nitride, aluminum nitride, boron nitride, zirconium nitride, hafnium nitride, and titanium nitride.

7. The method of claim 6, wherein said diluent is silicon nitride.

8. A combustion synthesis method for the preparation of dense aluminum nitride comprising the steps of:
   pouring aluminum powder into a suitable quartz container;
   placing a cold-pressed igniter pellet of Ti $B_{1.5}$ on top of said container;
   loading said container into a high pressure autoclave;
   pressurizing said autoclave with nitrogen gas to a pressure of about 1000 atmospheres;
   igniting said aluminum powder by igniting said Ti $B_{1.5}$ pellet;
   allowing the combustion to proceed to completion; and
   removing the aluminum nitride formed in said container.

9. A combustion synthesis method for the preparation of dense cermet of aluminum nitride in a matrix of aluminum comprising the steps:
   pouring aluminum powder into a suitable quartz container;
   placing a cold-pressed igniter pellet of Ti $B_{1.5}$ on top of said container;
   loading said container into a high pressure autoclave;
   pressurizing said autoclave with nitrogen gas to a pressure of about 680 atmospheres;
   igniting said aluminum powder by igniting said Ti $B_{1.5}$ pellet;
   allowing the combustion to proceed to completion; and
   removing the aluminum nitride-aluminum cermet formed in said container.

10. A combustion synthesis method for the preparation of a dense composite of aluminum nitride and silicon nitride comprising the steps:
    pouring a mixture of aluminum powder and silicon nitride powder into a suitable quartz container;
    placing a cold-pressed igniter pellet of Ti $B_{1.5}$ on top of said container;
    loading said container into a high pressure autoclave;
    pressurizing said autoclave with nitrogen gas to a pressure in the range of about 500 to about 680 atmospheres;
    igniting said aluminum powder by igniting said Ti $B_{1.5}$ pellet;
    allowing the combustion to proceed to completion; and
    removing the aluminum nitride-silicon nitride composite formed in said container.

11. A combustion synthesis method for the preparation of a dense composite of aluminum nitride and boron nitride comprising the steps:
    pouring a mixture of aluminum powder and boron nitride powder into a suitable quartz container;
    placing a cold-pressed igniter pellet of Ti $B_{1.5}$ on top of said container;
    loading said container into a high pressure autoclave;
    pressurizing said autoclave with nitrogen gas to a pressure in the range of about 500 to about 680 atmospheres;
    igniting said aluminum powder by igniting said Ti $B_{1.5}$ pellet;
    allowing the combustion to proceed to completion; and
    removing the aluminum nitride-boron nitride composite formed in said container.

* * * * *